United States Patent [19]
Arai

[11] 4,301,894
[45] Nov. 24, 1981

[54] CALIPER TYPE BRAKE FOR BICYCLES

[76] Inventor: Kenzo Arai, c/o Kenzo Arai, In Arai Co., Ltd., 2189, Sue, Saya-cho, Ama-gun, Aichi-ken, Japan

[21] Appl. No.: 87,479

[22] Filed: Oct. 23, 1979

[30] Foreign Application Priority Data

Oct. 23, 1978 [JP] Japan ............................ 53/146298[U]

[51] Int. Cl.³ ................................................ B62L 1/12
[52] U.S. Cl. .................................. 188/24.19; 188/216
[58] Field of Search ............ 188/2 D, 26, 216, 196 M, 188/196 R

[56] References Cited
FOREIGN PATENT DOCUMENTS
794069 12/1935 France .................................. 188/24

Primary Examiner—Duane A. Reger
Attorney, Agent, or Firm—Armstrong, Nikaido, Marmelstein & Kubovcik

[57] ABSTRACT

In a caliper type brake for bicycles, spring adjusting devices provided with grooves stepwise on the surface are inserted to both supporting portions of a return spring which drives right and left brake blocks to be stretched outwards, that is, to the engaging portions of the return spring with the spring supports. The clearance from right and left brake rubbers to the rim may be equalized by changing the engaging portions of the spring supports with a plurality of grooves of different heights constituted on the spring adjusting devices.

2 Claims, 6 Drawing Figures

CALIPER TYPE BRAKE FOR BICYCLES

BACKGROUND OF THE INVENTION (1) Field of the Invention

The present invention relates to caliper type brakes for bicycles and, more particularly, to a caliper type brake in which a spring adjusting device is inserted in supporting portion for a return spring used in a brake mechanism, thereby the spring force is equalized in both sides of the return spring and adjustment for preventing the unbalanced braking ability can be readily effected.

(2) Description of the Prior Art

A conventional caliper type brake for bicycles is constituted as illustrated in FIGS. 1 and 2. There is shown a brake comprising a left block 1 and a right block 2 which are connected together by a through bolt 3 with washers 4 and 5 and are fixed at a definite position by a nut 7. Numeral 8 designates a locknut. Referring to FIG. 3, the through bolt 3 consists of bolt portions 9, 9' and a collar 10. The left block 1 and the right block 2 are attached to the bolt portion 9. The through bolt 3 is attached to a bicycle frame (not shown) at the bolt portion 9' through washers 11, 11' and is fixed by a washer 12 and a nut 13. The collar 10 is provided with a groove 15 to which the center horizontal portion of a return spring 14 is fitted and supported. Both ends of the return spring 14 are attached respectively to the inside of spring supports 1', 2' connected to the left block 1 and the right block 2 by means of spot welding, so that both blocks 1, 2 are stretched outwards. Ends of the left block 1 and the right block 2 are respectively provided with brake rubbers 16, 16'. A wire clamping screw 17 is attached to the other end of the left block 1; an adjusting screw 19 is attached to the other end of the right block 2 through a setscrew 18. An outer wire 20 of a brake operating Bowden cable is supported to the upper end of the adjusting screw 19, and an inner wire 21 thereof is fixed by inserting the lower end to the wire clamping screw 17.

After the caliper type brake constituted as above is attached to a bicycle frame, the brake rubbers 16, 16' are brought into contact with the side surface of a rim 28 and the inner wire 21 is fixed by the wire clamping screw 17, and then the clearance between the rim and the brake rubber is finely adjusted by the adjusting screw 19. Although the clearance between the rim and the brake rubber must be balanced in right and left directions, working tolerance in the size and tension of the return spring 14 may cause to unequal spring force in right and left directions and also to unbalanced braking ability. In prior art, the adjustment of the clearance between the brake rubber and the rim had to be effected by very troublesome process such that the return spring is changed or that the through bolt 3 is released from the fixing state to the frame and rotated for the clearance adjustment in right and left directions.

SUMMARY OF THE INVENTION

An object of the present invention is to provide a caliper type brake for bicycles wherein the clearance between the brake rubber and the rim in right and left direction can be readily adjusted in balanced state.

Another object of the present invention is to provide a caliper type brake for bicycles wherein the balanced adjustment of the clearance between the brake rubber and the rim in right and left directions prevents the unbalanced ability.

The present invention is characterized in the constitution that spring adjusting devices, each being provided with a plurality of grooves of different depths, are inserted to right and left supporting portions for the return spring which drives the right and left blocks of the brake into stretched state, and the engaging portions of the grooves of the spring adjusting devices with the spring supports for supporting the return spring may be changed, thereby the force of the return spring in right and left directions is adjusted and the clearance between the brake rubber and the rim is equalized.

The above and further objects and features of the present invention will become obvious from the following description taken in connection with the accompanying drawings. It is to be understood, however, that the drawings are for purpose of illustration only and are not intended as a definition of the limits of the invention.

DESCRIPTION OF THE PREFERRED EMBODIMENT

Referring to the attached drawings, an embodiment of the present invention will be explained as follows.

Figure 1:
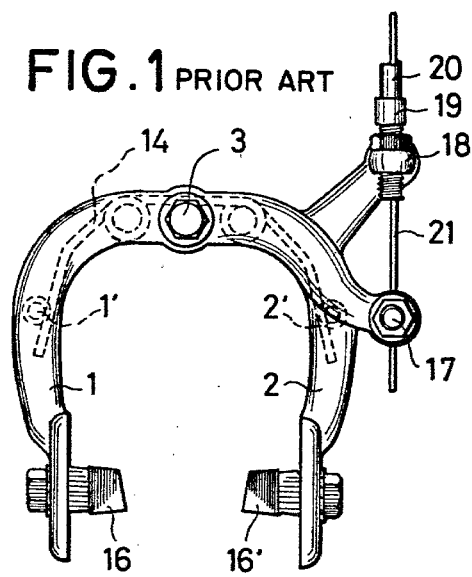
FIG. 1 is an elevational view of a caliper type brake for bicycles in prior art.
Figure 2:
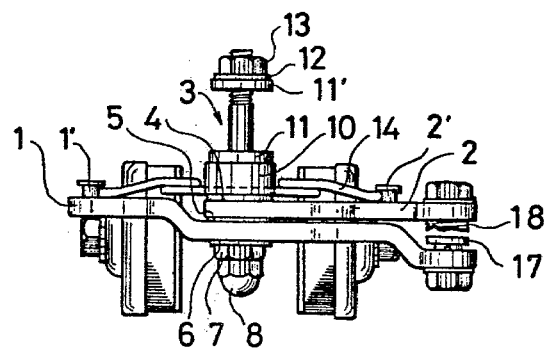
FIG. 2 is a plan view of the caliper type brake in FIG. 1.
Figure 3:
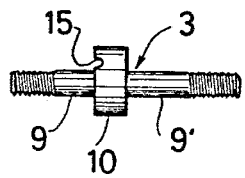
FIG. 3 is a side view of a through bolt.
Figure 4:
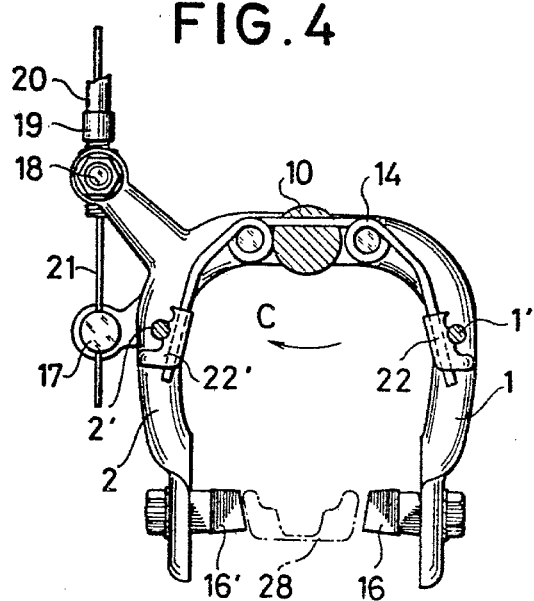
FIG. 4 is a vertical section of a caliper type brake for bicycles of the present invention.
Figure 5:
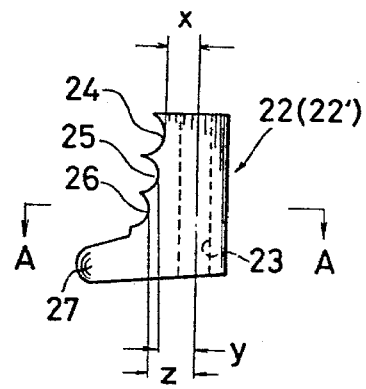
FIG. 5 is an elevational view of spring adjusting device.
Figure 6:
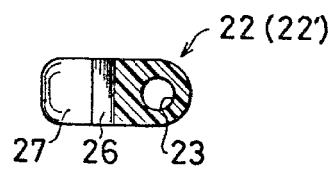
FIG. 6 is a vertical section taken on the line B—B of FIG. 5.

In FIG. 4, a caliper type brake for bicycles comprises a right block 1 and a left block 2 which constitute a horse-shoe-shaped structure pivoted by a through bolt 3 at the center. Brake rubbers 16, 16' are respectively attached to the inside of ends of the right and left blocks 1, 2 and opposite to each other. A return spring 14 is fitted to a groove 15 on a collar 10 of the through bolt 3 and supported by stud-pin type spring supports 1', 2' projecting at intermediate portion of the right and left blocks 1, 2, so that both blocks 1, 2 are stretched outwards. Spring adjusting devices 22, 22' molded by hard plastics are interposed between the spring supports 1', 2' and the return spring 14. Referring to FIGS. 5 and 6, each of the spring adjusting devices 22, 22' is provided with a through hole 23 for inserting the end of the return spring 14, and at one side it is also provided with three grooves 24, 25, 26 engaged with the spring supports 1', 2' constituted on the right and left blocks 1, 2. The three grooves 24, 25, 26 are constituted stepwise, and they become farther in order from the center axis of the through hole 23, that is, as shown in FIG. 5, the distances X, Y, Z from the center axis of the through hole 23 respectively to the grooves 24, 25, 26 are in following relation.

$$X < Y < Z$$

A knob 27 constituted on the base portion of each of the spring adjusting devices 22, 22' is used to move the devices 22, 22' upwards and downwards.

The caliper type brake for bicycles consituted as above described is adjusted as follows. The caliper type brake is attached to a bicycle by the through bolt. If the clearance from the left brake rubber 16' to the rim 28 is less than that from the right brake rubber 16 as shown in FIG. 4, the left spring adjusting device 22' is moved upwards and the engaging position of the spring support 2' is changed from the groove 25 to the groove 26. Then the spring force of return spring 14 increases at the left side, and the right and left blocks 1, 2 is slightly turned in arrow "C" direction so as to slightly widen the clearance between the left brake rubber 16' and the rim 28, thereby the clearance from the right and left brake rubbers 16, 16' to the rim 28 is equalized. In this case, similar effect is attained by moving the right spring adjusting device downwards and changing the engaging position of the spring support 1' from the groove 25 to the groove 24. On the other hand, if the clearance from the left brake rubber 16' to the rim 28 is greater than that in the right side, the completely reverse operation to the above mentioned is carried out thereby the clearance from the right and left brake rubbers 16, 16' to the rim 28 is equalized and the adjustment prevents the unbalanced braking ability.

If the clearance is not equalized by separate adjustment in the right and left spring adjusting devices 22, 22', both adjusting devices 22, 22' may be moved simultaneously.

As above described, the caliper type brake for bicycles according to the present invention consists in that the spring adjusting devices, each provided at one side thereof with a plurality of grooves having different heights, are attached to engaging portions with the spring supports in both ends of the return spring which drives the right and left brake blocks in horse-shoe shape to be stretched outwards, the spring supports are fitted to the grooves of the spring adjusting devices, and both ends of the return spring are supported by the spring supports through the spring adjusting devices. Accordingly, the invention has the effect that the clearance from the right and left brake rubbers to the rim may be equalized by simple operation of moving the right and left spring adjusting devices along the return spring, thereby the unbalanced braking ability is prevented.

What is claimed is:

1. A caliper type brake for bicycles, comprising right and left blocks in horse-shoe shape pivoted at the center each have a spring support, brake rubbers which are attached to the ends of said right and left blocks and opposite to each other, a return spring which drives said right and left blocks to be stretched outwards, and spring adjusting devices, each being provided at one side thereof with a plurality of grooves having different heights, said devices being attached to engaging portions of said return spring constituted in said right and left blocks with the spring supports for supporting said return spring, wherein the spring supports are fitted to the grooves of said spring adjusting devices.

2. A caliper type brake for bicycles according to claim 1 characterized in that said spring adjusting device are provided with through holes and the return spring is inserted to said through holes, thereby said spring adjusting devices are slidably attached to said return spring, and knobs are constituted on said spring adjusting devices.

* * * * *